A. M. ALLEN.
Velocipede.
No. 94,056.  Patented Aug. 24, 1869.
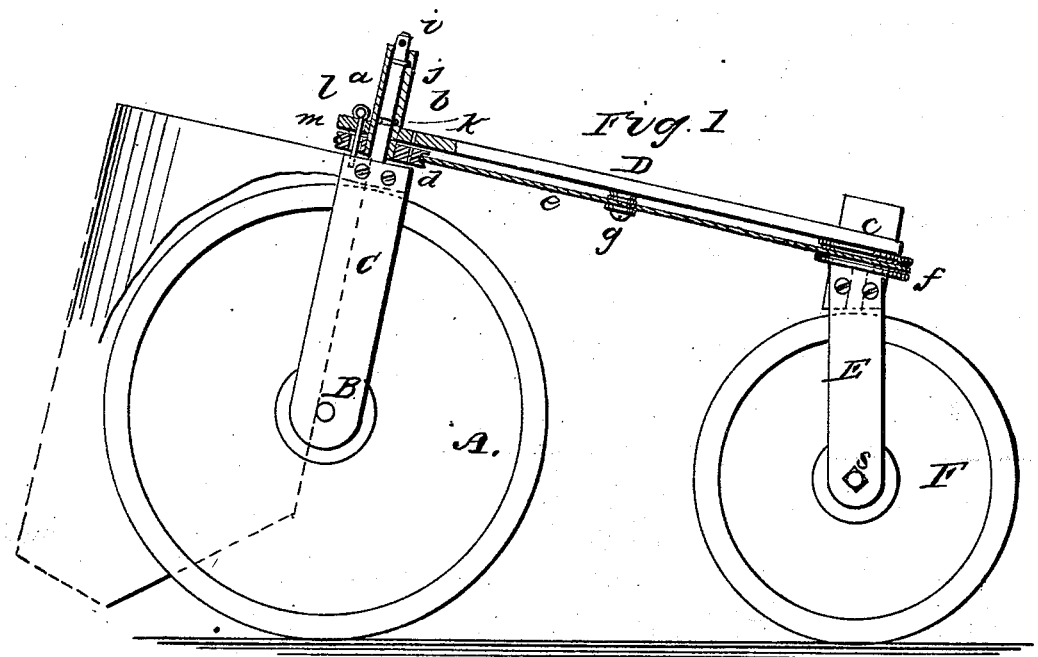
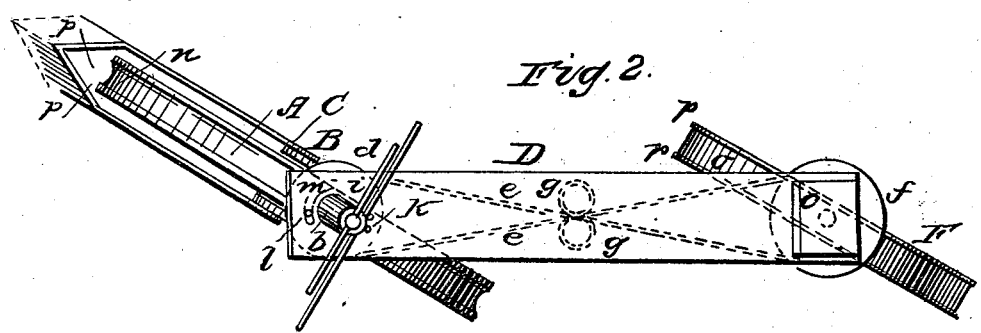
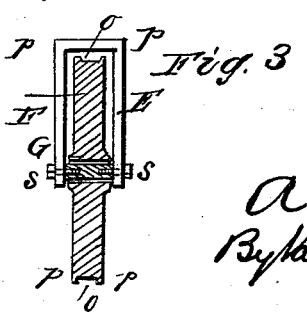
Witnesses
E. Kastenhuber
C. Wahlers
Inventor
A. M. Allen
By Kastenhuber & Stauff
his Attys

United States Patent Office.

ARTHUR M. ALLEN, OF NEW YORK, N. Y.

Letters Patent No. 94,056, dated August 24, 1869.

IMPROVED VELOCIPEDE

The Schedule referred to in these Letters Patent and making part of the same.

*To all whom it may concern:*

Be it known that I, ARTHUR M. ALLEN, of the city, county, and State of New York, have invented a new and useful Improvement in Velocipedes; and I do hereby declare the following to be a full, clear, and exact description thereof, which will enable those skilled in the art to make and use the same, reference being had to the accompanying drawing, forming part of this specification in which drawing—

Figure 1 represents a sectional side elevation of this invention.

Figure 2 is a plan or top view of the same.

Figure 3 is a transverse section of one of the wheels with its standard.

Similar letters indicate corresponding parts.

This invention consists in so combining the two wheels of a velocipede with the steering-gear, that both wheels turn in one and the same direction, whereby the operation of moving sideways quickly is materially facilitated, and the balance of the machine is preserved; also, in the arrangement of a sleeve, carrying a pulley, which connects, by ropes, chains, or rods, with the hind wheel, in combination with the pivot rising from the standard of the front wheel, and with a suitable stop or clamping-mechanism, in such a manner that either wheel can be used as a steering-wheel, and turned independent of the other, or that both wheels can be turned simultaneously, either in the same or in opposite direction, as the rider may desire, and that the rider is enabled to make all these changes while the machine is in motion, and without leaving the saddle; also, in providing the tires of the wheels with grooves, being at least twice as wide as the tread or surface of an ordinary T-rail, and having flat treads on each side, in such a manner that said wheels, when running on a single rail, can be conveniently steered without cramping, and that, by means of the flat sidetreads, the wheels are capable of passing easily over crossings, switches, or frogs, or of running on regular roads or streets; further, in the arrangement of a curved groove in the tire of the wheel, so that said tire will bear on the two outside edges of the rail, and that the weight of the rider will have a tendency to keep the wheel on the centre, thereby insuring a more perfect balance of the machine while running on a single rail.

The shaft of the hind wheel, or of either or of both wheels, is secured between its standard by means of screws, so that it forms a brace, whereby the standard is materially strengthened, the wheel being made to turn freely on the shaft, and the whole being so arranged that the several parts can be readily taken apart.

A sharp-edged bow is attached to the front-wheel standard, so as to decrease the resistance of the air in running at high speed.

In the drawing, the letter A designates the front wheel of a velocipede, which is mounted on an axle, B, that has its bearings in a standard, C.

From this standard rises a pivot, $a$, which has its bearings in a sleeve, $b$, that connects, by the reach D, with the pivot $c$ of the hind-wheel standard E.

On the bottom end of the sleeve $b$ is mounted a pulley or lever, $d$, which connects, by ropes or chains $e$, with another pulley or lever, $f$, which is mounted on the pivot of the hind-wheel standard E, and said ropes or chains pass through between guide-rollers $g$, secured to the under surface of the reach, and situated close together, so that they hold the ropes or chains clear of the legs of the rider occupying the saddle of the velocipede, and that said ropes or chains can be crossed or not without changing their length.

The standard E straddles the hind wheel F, and forms the bearings for the hind axle G.

This axle is secured between the arms of the standard E by means of screws $s$, and it forms a brace, whereby the standard is rendered stiff, and its strength and durability are materially increased. The wheel turns freely on the axle, its hub being faced off so as to fit nicely between the two arms of the standard. By removing the screws $s$, the wheel, together with its axle, can be taken out, and easy access can be had to every part of the bearing. According to the nature of the driving-gear, this construction of the axle is also applicable to the front or driving-wheel.

In the pivot $a$, of the front-wheel standard, is a transverse socket, to receive a handle, $i$, and the sleeve $b$ is also provided with a socket, to receive a handle, $j$, and the sleeve and pivot are so constructed that they can be coupled together, by a pin passing transversely through them, or the sleeve may be split open, and provided with a clamping-screw, or it may be coupled together with the pivot in any other desirable manner.

When the sleeve and pivot are coupled together, and turned by means of the handles $i$ or $j$, the wheels A and F are both turned in the same direction, and the machine can move sideways quickly, while the balance of the rider is not disturbed, as will be readily understood by referring to fig. 2 of the drawing.

The operation of turning a curve is facilitated by giving to the front-wheel standard a little rake backward, so that the front wheel, on being turned to the position shown in fig. 2, is also inclined inward to the proper position for turning a curve.

It must be further observed that the pulley $d$ on the front-wheel standard must be made somewhat larger or smaller than the pulley $f$ on the hind-wheel standard, so that the two wheels, on being turned to the position shown in fig. 2, will not be paralled to each other, for if they should remain parallel, the machine would not turn a curve, but run in a rectilinear direction. It is also desirable, or almost indispensable for the prompt action of my steering-mechanism, that the front wheel shall be somewhat larger than the hind wheel.

If the sleeve $b$ and pivot $a$ of the front-wheel standard are uncoupled, the wheels A and F may be turned in opposite directions. Provision is also made to fasten either of the standards, and to steer with the other alone.

The hind-wheel standard is fastened by inserting a pin into a socket, $k$, passing through the reach, and into the pulley $d$ on the front-wheel standard. In this case, the hind-wheel standard is retained by the steering-rope or chain, and the machine can be steered by the front wheel alone.

The front-wheel standard is fastened by inserting a pin into a socket, $l$, passing through the reach, and through a curved slot, $m$, in the pulley $d$, into the standard C, as shown in fig. 1. By securing the handle $j$ in the sleeve $b$, the hind-wheel standard can be turned, and the machine steered by the hind wheel alone, the curved slot $m$ in the pulley $d$ being of sufficient length to permit the required motion.

The tires of the wheels A and F are provided with grooves $n$ $o$, and these grooves are either flat, and at least twice as wide as the top of an ordinary T-rail, so that the machine may be turned enough between the flanges to keep it balanced, or the grooves may be curved, as shown on the front wheel, so that the weight of the rider has a tendency to keep the wheel always in the centre over the rail on which it moves.

In either case the wheel is provided with flat side-treads, $p$, so that it can run on an ordinary road or street, and said side-treads also facilitate the passage of the wheel over crossings, switches, or frogs, when running on a railroad-track.

In order to decrease the resistance of the air when running at high speed, I attach to the front-wheel standard a sharp-edged bow, H, as shown in fig. 2.

The connection between the reach and the standard in this machine is made on the principle of the fifth-wheel of an ordinary wagon, so that the joint is braced better than by the pivot and socket. The tires of the wheels being much wider than ordinary ones, are also heavier, and thereby materially assist the rider in keeping up high speed.

Having thus described my invention,

What I claim as new, and desire to secure by Letters Patent, is—

1. A velocipede, having its front and hind wheels connected together by means of cross-cords or chains, through the medium of pulleys $d$ $f$, of different diameters, so that the wheels will turn in the same direction, but at different angles, so as to describe different circles, for the purpose of steering, as set forth.

2. The sleeve $b$, in combination with the pivot $a$ of the front-wheel standard C, and with the pulleys $d$ $f$ and hind-wheel standard E, substantially as shown and described.

3. The sockets $k$ and $l$, in combination with the sleeve $b$, pivot $a$, pulley $d$, and standards C E of a velocipede, substantially as set forth.

4. The guide-rollers $g$, in combination with the ropes or chains $e$, reach D, and pulleys $d$ $f$, on the front and hind-wheel standards of a velocipede, substantially as described.

5. The angular bow H, attached to the standard of the front wheel of a velocipede, so as to turn with the latter in its various directions, as and for the purpose described.

This specification signed by me, this 11th day of June, 1869.

ARTHUR M. ALLEN.

Witnesses:
W. HAUFF,
E. F. KASTENHUBER.